May 17, 1927.

F. A. TICE 1,629,368

HANGER FOR TROLLEY WIRES

Filed Sept. 11, 1925

Inventor

Francis A. Tice,

By Murray & Fugeltin

Attorneys.

Patented May 17, 1927.

1,629,368

UNITED STATES PATENT OFFICE.

FRANCIS A. TICE, OF CINCINNATI, OHIO, ASSIGNOR TO THE ELECTRIC RAILWAY EQUIPMENT COMPANY, OF CINCINNATI, OHIO, A CORPORATION OF OHIO.

HANGER FOR TROLLEY WIRES.

Application filed September 11, 1925. Serial No. 55,816.

An object of this invention is to provide a hanger for trolley wires and the like which may be simply and expeditiously mounted and removed.

Another object of my invention is to provide a device of this kind which is adapted to be rigidly mounted upon a suitable insulating support and which may be subsequently adjusted to any desired position without disturbing its rigid mounting upon the support.

Another object is to provide a device of this kind in which vibration of the wire clamping members can effect no damage upon the insulating support member upon which it is mounted.

Another object is to provide a device of this kind which is positively retained in any of its adjusted positions.

These and other objects are attained by the means described herein and disclosed in the accompanying drawings, in which.

Figure 1:
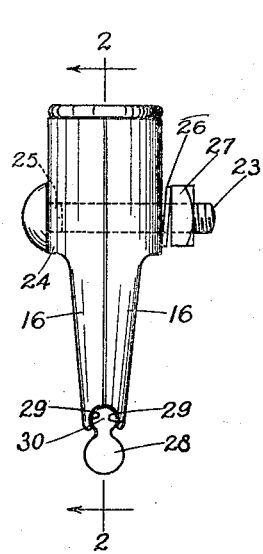
Fig. 1 is an end view of the device of my invention.
Figure 2:
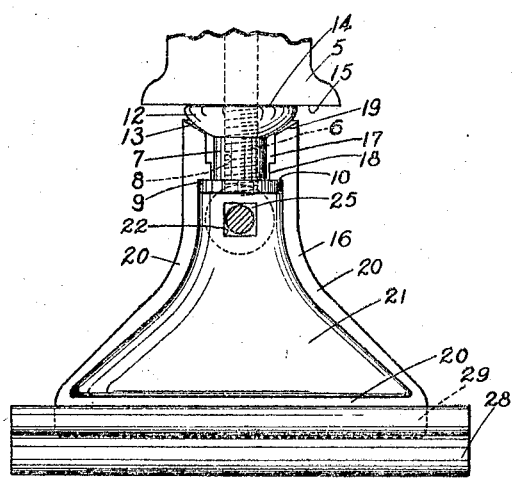
Fig. 2 is a view taken on line 2—2 of Fig. 1.

The device of my invention provides a simple and effective hanger for trolley wires and the like, and comprises a simple assembly of uniform parts consisting of a support collar adapted to be rigidly screwed onto a depending stud carried by any suitable insulating support and a pair of similar jaws or clamping plates provided with a single fastening means for securing said jaws in an adjusted position upon the support collar and also serving to secure a feed wire between said jaws.

An insulating support 5 of any desired type is provided with a depending threaded stud 6, upon which the device of my invention may be mounted. The device comprises a support collar 7 having a threaded bore 8 for receiving the threads on the stud 6. The support collar 7 is provided at its lower end with an annular flange 9 having a substantially flat shoulder 10. The opposite end of the support collar 7 carries a shoulder 12 having a rounded face 13 disposed in the direction of the body of the collar 7 and a flat outer face 14 adapted to abut the lower flat face 15 of the insulator 5. From the foregoing it will be apparent that when the support collar 7 is screwed tightly against the insulator, the face 14 of the collar will abut a considerable area of the face 15 of the insulator, thereby providing a rigid mounting for the collar. A pair of clamping jaws 16 are identical in construction, and a description of one will suffice for both. The jaws 16 have complementary semicircular grooves 17 at the upper portions thereof so that when a pair of said jaws are placed together, the grooves 17 together will form a bore somewhat greater in diameter than the outside diameter of the main body portion of support collar 7. Semicircular flanges 18 are provided in the grooves 17 for providing an annular flange adapted to abut the flat shoulder 10 on the collar 7 so that a pair of jaws 16 may be conveniently supported thereon. Tapered shoulders 19 are provided at the upper ends of the jaws 16 and abut the curved faces 13 of the shoulder 12 on support collar 7. Narrow faces 20 on the jaws 16 bound a large central depression 21 in the body of each of the jaws so that when a pair of the jaws 16 are clamped about collar 7, the faces 20 will lie in close proximity with one another but will preferably be slightly spaced one from the other so that the tapered face 19 may bind upon the outside face 13 of collar flange 12. In order to permit expeditious clamping of the jaws 16, each of said jaws is provided with a substantially square perforation 22 disposed slightly below the flange 18. A clamp bolt 23 may be provided with any suitable head having a flat lower face 24 and a square shank 25 which may readily seat within the square perforation 22 in one of the jaws 16. A lock washer 26 may then be inserted over the protruding end of the clamp bolt 23 and a suitable nut 27 screwed tightly against the lock washer 26. When the nut 27 is tightened, the pair of jaws 16 are securely clamped upon the collar 7 whereupon the device, as a unit, may be screwed upon a stud such as 6, a wrench being used upon the lower depending ends of the jaws if necessary. In this manner, the collar has been effectively mounted upon the insulating support 5 and the device is now ready to receive a trolley wire such as 28 between the complementary grooves 29 thereof. When it is desired to hang a trolley wire from the devices of my invention, said devices having been mounted as just described, are adapted to have the jaws 16 loosened by unscrewing nut 27, whereupon the jaws 16 may be rocked outwardly for a distance, the rounded face 13 of the shoulder 12 permitting such rocking movement without removing the flange 18 entirely from the shoulder face 10 on the collar. The jaws may then be separated sufficiently to permit free rotation of the pair of jaws about the collar 7 in order to position said jaws at the proper angle for receiving trolley wires such as 28. The jaws may at this time also be separated sufficiently at their lower ends so that the rib 30 on trolley wire 28 may be inserted between the complementary grooves 29, whereupon the nut 27 is again tightened, clamping the rib 30 on the trolley wire and at the same time securely clamping the jaw members 16 in their adjusted position upon the collar 7.

It should be noted that the vibration of the trolley wire 28 and clamping jaws 16 cannot effect abrasion or wearing away of the insulator 5, since the upper ends of the jaws contact the rounded face 13 on collar 7 and do not touch the insulator itself. This feature is of considerable importance since any damage to the insulator may result in the loosening of the hanger and may cause rapid deterioration of the entire structure.

What I claim is:

1. In a device of the class described the combination with an insulator having depending stud of a support collar adapted to be secured to the stud in abutment with the insulator, a rounded shoulder adjacent the abutment end of the collar, a flange on the opposite end of said collar for providing a second shoulder in spaced relation with the rounded shoulder on said collar, a pair of clamping jaws, having semi-circular grooves therein for receiving the collar, semi-circular flanges disposed within the grooves and seating upon the second shoulder on the collar, inwardly tapered faces on each jaw abutting the rounded shoulder on the collar and means extending through the jaws for binding the jaws between the shoulders on the collar.

2. In a device of the class described the combination of a collar a rounded shoulder on said collar adjacent one end, a flange at the opposite end of the collar, a pair of hollow clamping jaws provided with rounded inwardly tapering faces adjacent one end, said jaws having semi-circular flanges for seating upon the flange on the collar and means for drawing the jaws together and binding said jaws upon the collar with the inwardly tapered portions abutting the rounded shoulder of the collar and the interior of the bodies of said jaws abutting the flange at the opposite end of the collar.

3. In a trolley hanger the combination of a support collar for rigid mounting on an insulator, spaced annular projections on said collar for providing opposed convergent faces thereon, a clamping ear comprising a pair of jaw members formed at one end so that they may together encircle the collar and abut the opposed faces thereon, and means for binding said members between the opposed faces on the collar.

4. In a trolley hanger the combination of a support collar having opposed convergent annular faces, a trolley ear comprising a pair of jaws adapted to receive between them the collar and to abut the opposed annular faces thereof and means for drawing the jaws together for clamping the jaws between the annular faces on the collar.

5. In a trolley hanger the combination of a collar having flanges on its opposite ends and providing opposed convergent faces, trolley ear comprising a pair of jaw members having semi-circular grooves adjacent one end for embracing the collar, semi-circular flanges in the grooves in the jaws adapted to seat upon one of the opposed faces on the collar, the ends of said jaws being tapered for abutment with the other of said opposed faces on the collar and means extending through the jaws intermediate the ends thereof for drawing the jaws together and binding them in two-point frictional contact upon the collar, the free ends of the jaws being grooved to receive and clamp between them a trolley wire.

In testimony whereof, I have hereunto subscribed my name this 9th day of September, 1925.

FRANCIS A. TICE.